United States Patent
Agarwal et al.

(10) Patent No.: US 10,181,335 B2
(45) Date of Patent: Jan. 15, 2019

(54) ADVANCED HEATER-ASSISTED MEDIA BURNISHING HEAD MEDIA BURNISH PROCESS

(75) Inventors: Shashi Bhushan Agarwal, Santa Clara, CA (US); Huan Tang, Los Altos, CA (US); Jing Gui, Fremont, CA (US)

(73) Assignee: SEAGATE TECHNOLOGY LLC, Scotts Valley, CA (US)

( * ) Notice: Subject to any disclaimer, the term of this patent is extended or adjusted under 35 U.S.C. 154(b) by 789 days.

(21) Appl. No.: 12/133,353

(22) Filed: Jun. 4, 2008

(65) Prior Publication Data

US 2009/0303634 A1 Dec. 10, 2009

(51) Int. Cl.
*G11B 5/127* (2006.01)
*G11B 5/00* (2006.01)
*G11B 5/41* (2006.01)
*G11B 5/31* (2006.01)
*G11B 5/455* (2006.01)

(52) U.S. Cl.
CPC .............. *G11B 5/41* (2013.01); *G11B 5/3169* (2013.01); *G11B 5/455* (2013.01)

(58) Field of Classification Search
CPC .......... G11B 5/3169; G11B 5/455; G11B 5/41
USPC .................. 134/6, 16, 17, 18, 19, 26, 32, 34
See application file for complete search history.

(56) References Cited

U.S. PATENT DOCUMENTS

| | | | |
|---|---|---|---|
| 5,748,407 A | | 5/1998 | Schaenzer et al. |
| 5,880,899 A | * | 3/1999 | Blachek et al. ................ 360/66 |
| 2002/0034035 A1 | * | 3/2002 | Vettiger et al. ................ 360/75 |
| 2002/0126416 A1 | * | 9/2002 | Smith ........................... 360/128 |
| 2006/0023354 A1 | * | 2/2006 | Stipe ............................ 360/128 |
| 2006/0092570 A1 | * | 5/2006 | Payne et al. ............... 360/236.5 |
| 2006/0130874 A1 | | 6/2006 | Lee et al. |

* cited by examiner

*Primary Examiner* — Alexander Markoff
(74) *Attorney, Agent, or Firm* — Hall Estill Attorneys at Law

(57) ABSTRACT

A method and system for cleaning and/or burnishing an article. The article is operated on by a burnishing object having one more cutting edges and one or more heating surfaces. The article rotates relative to the burnishing head and the cutting edges remove asperities from the article. The heating surface can be activated and can optionally protrude from the burnishing head to further reduce roughness of the surface of the article as the article is rotating relative to the head. The cutting edges and heating surfaces can be configured in shape and size (i.e., geometry) to accommodate the article.

5 Claims, 2 Drawing Sheets

ADVANCED HEATER-ASSISTED MEDIA BURNISHING HEAD MEDIA BURNISH PROCESS

FIELD OF THE INVENTION

The present invention relates to the recording, storage and reading of magnetic data, particularly burnishing or wiping rotatable magnetic recording media, such as thin film magnetic disks having smooth surfaces for data storage and apparatus for heat-assisted burnishing or wiping a media surface.

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head.

A disk recording medium is shown in FIG. 1. Even though FIG. 1 shows sequential layers on one side of the non-magnetic substrate 10, it is known to sputter deposit sequential layers on both sides of the non-magnetic substrate.

Adverting to FIG. 1, a sub-seed layer 11 is deposited on substrate 10, e.g., a glass or glass-ceramic, Al or AlMg substrate. Subsequently, a seed layer 12 is deposited on the sub-seed layer 11. Then, an underlayer 13 is sputter deposited on the seed layer 12. An intermediate or flash layer 14 is then sputter deposited on underlayer 13. Magnetic layer 15 is then sputter deposited on the intermediate layer, e.g., CoCrPtTa. A protective covering overcoat 16 is then sputter deposited on the magnetic layer 15. A lubricant topcoat (not shown in FIG. 1 for illustrative convenience) is deposited on the protective covering overcoat 16.

The disk is finely balanced and finished to microscopic tolerances. Take the smoothness of its surface, for example. The drive head rides a cushion of air at microscopic distances above the surface of the disk. So, the surface cannot be too smooth, or the drive lead will end up sticking to the disk, and it cannot be too rough either, or the head will end up getting caught in the microscopic bumps on the surface.

It is considered desirable during reading and recording operations to maintain each transducer head as close to its associated recording surface as possible, i.e., to minimize the flying height of the head. This objective becomes particularly significant as the areal recording density increases. The areal density ($Mbits/in^2$) is the recording density per unit area and is equal to the track density (TPI) in terms of tracks per inch times the linear density (BPI) in terms of bits per inch.

In recent years, considerable effort has been expended to achieve high areal recording density. In particular, the requirement to further reduce the flying height of the head imposed by increasingly higher recording density and capacity renders the disk drive particularly vulnerable to head crash due to accidental glide hits of the head and media. To avoid glide hits, a smooth defect-free surface of data zone is desired. The direct result of these demands is tending towards low yield due to less defect tolerance at the surface of the media. Thus, it is desired to arrive at an improved mechanism for burnishing/polishing the surface of the discs to produce defect-free surface.

SUMMARY OF THE INVENTION

In accordance with one aspect of the present invention, a method of operating a cleaning apparatus is provided. The cleaning apparatus includes an article and a burnishing object positioned over or under the article. The burnishing object has at least one cutting edge and at least one heating element. The burnishing object is rotated over an area of the article. The burnishing object is translated relative to advance a position of a contact between the cutting edge and the article across a surface of the article. The heating surface can then be activated and translated across relative to the article to advance the heating element across the surface of the article.

In accordance with a further aspect of the present invention, a burnishing head for burnishing an article is provided. The burnishing head includes one or more cutting edges positioned over or under the article; and at least one heating surface that is selectively operable to further burnish the article.

These and other features of the present invention are described and illustrated by the figures and the embodiments described below.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the views and in which.

DETAILED DESCRIPTION

Figure 1:
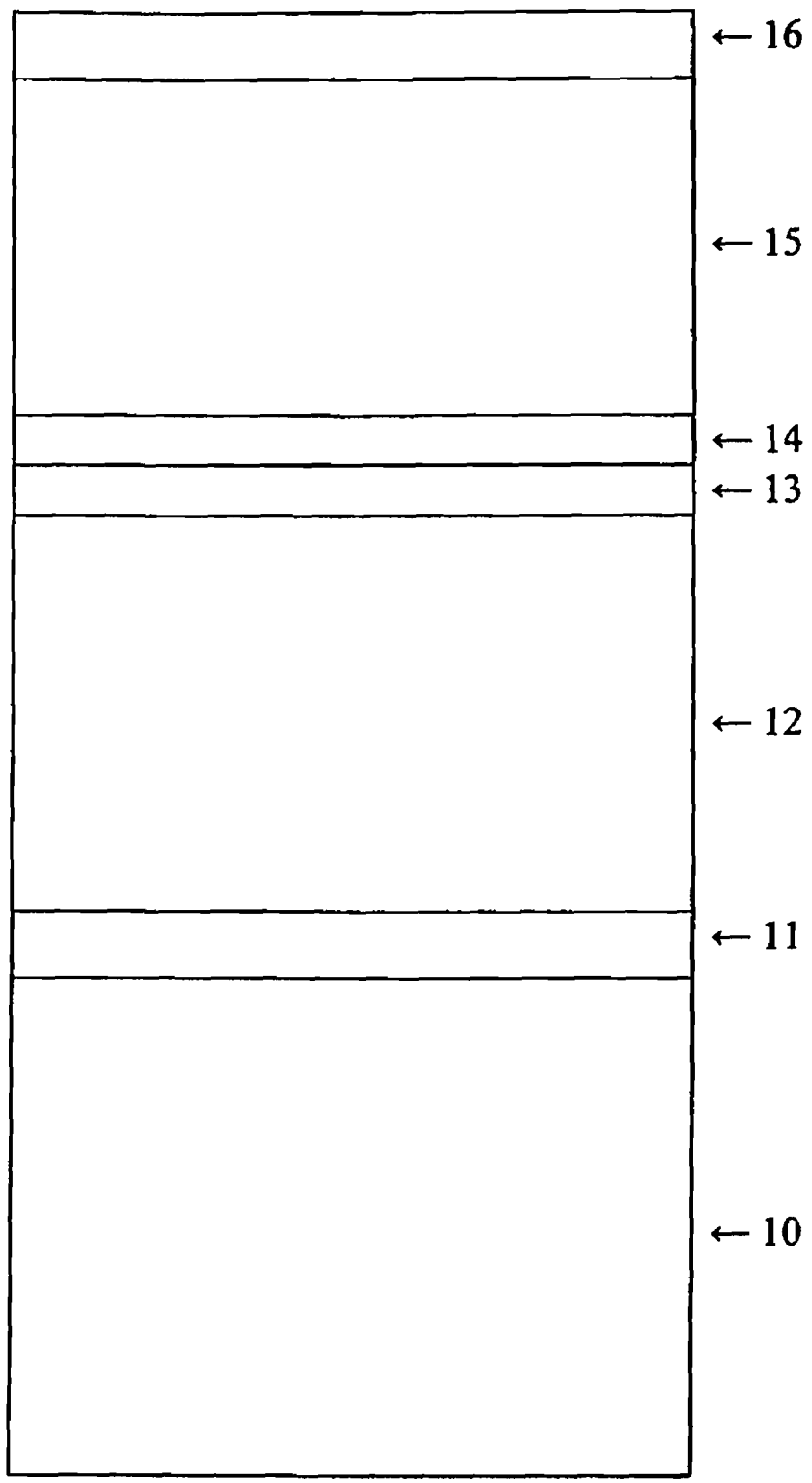
FIG. 1 schematically shows a film structure of a magnetic recording medium.

Almost all the manufacturing of the disks takes place in clean rooms, where the amount of dust in the atmosphere is kept very low, and is strictly controlled and monitored. The disk substrates come to the disk fabrication site packed in shipping cassettes. For certain types of media, the disk substrate has a polished nickel-coated surface. The substrates are preferably transferred to process cassettes to be moved from one process to another. Preferably, the cassettes are moved from one room to another on automatic guided vehicles to prevent contamination due to human contact.

The first step in preparing a disk for recording data is mechanical texturing by applying roughness and grooves to the polished surface of the substrate. This helps in depositing a magnetic material on the substrate. During the texturing process, small amounts of nickel get removed from surface of the disk and remain there. To remove this, the substrate is usually washed. Also, techniques for polishing the surface of the non-magnetic substrate of a recording medium use slurry polishing, which requires wash treatment. Thus, disk substrates are washed after texturing and polishing. However, wash defects could be one of the top yield detractors.

The next step is the formation of the landing area (preferably, a 2-4 mm band near the center) where the read head comes to rest. Preferably, the landing area is formed by laser texturing, which is done by creating microscopic bumps, using a laser. This prevents the head from clinging to the disk surface when the disk is spinning.

A final cleaning of the substrate is then done using a series of ultrasonic, megasonic and quick dump rinse (QDR) steps. At the end of the final clean, the substrate has an ultra-clean surface and is ready for the deposition of layers of magnetic media on the substrate. Preferably, the deposition is done by sputtering.

There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some spike formation on the substrate. These spikes need to be removed to ensure that they do not lead to scratching between the head and substrate. Thus, a lube is preferably applied to the substrate surface as one of the top layers on the substrate.

Once a lube is applied, the substrates move to the tape burnishing and tape wiping stage, where the substrate is polished while it preferentially spins around a spindle. After buffing/burnishing, the substrate is wiped and a clean lube is evenly applied on the surface.

Subsequently, the disk is prepared and tested for quality through a three-stage process. First, a burnishing head passes over the surface, removing any bumps (asperities). The glide head then goes over the disk, checking for remaining bumps, if any. Finally the certifying head checks the surface for manufacturing defects and also measures the magnetic recording ability of the substrate.

Burnishing can be accomplished by passing a burnishing head over the surface of the disk to eliminate asperities or other tall defects on the magnetic disk surface that can interfere with the flying head. Burnishing heads can fly above the surface of the disk as it rotates and thus have their own fly characteristics. Burnishing heads can also contact the disk media lightly as the disc rotates.

Figure 2:
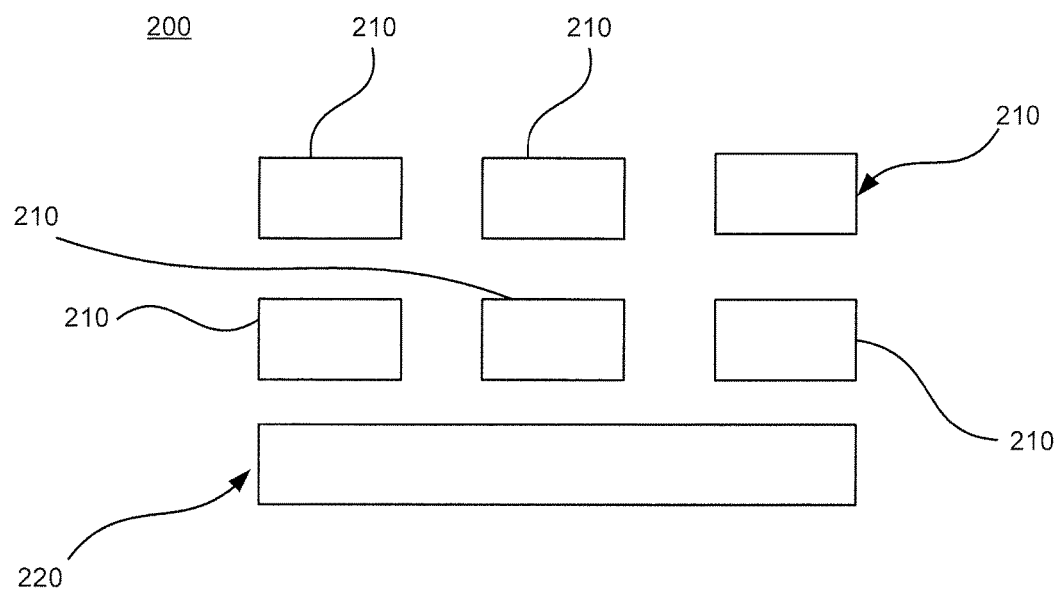
FIG. 2 illustrates the heater assisted burnishing head in accordance with one embodiment of the present invention.

As illustrated in FIG. 2, in accordance with the present invention, the burnishing heads 200 can include cutting edges 210 that can shear or cut away the asperities on the disc surface. Preferably the burnishing heads 200 maintain a stable proximity fly height. Further, the spacing between the burnishing head 200 and media surface can be less than 10 Angstroms.

The burnishing head 200 can include a heating element 220 which can be embedded in the body of the head in addition to the cutting edges 210 on the slider. The passive fly height of the burnishing head 200 remains the same as the conventional media burnish head 200. Upon activation of the heater 220 in the slider body, a controlled part of the slider (i.e., the burnishing pad) protrudes from the slider body. The protrusion can be shaped so that it is protrudes a predetermined height of the cutting faces or islands.

In accordance with one aspect of the present invention, conventional burnishing of the disk can be burnished in a conventional manner known in the art. Once conventional burnishing is completed one or more final passes can be made by the burnishing head 200 with the heater 220 of the burnishing pad activated. The protruded pad can wear away the asperities. Further, because the heated area is small, the flying characteristics of the burnishing head 200 will not be affected. This process will create a surface free of asperities and having a very flyable non-abrasive surface.

A technique for buffing/burnishing is tape burnishing (buffing). However, the technique is attendant with numerous disadvantages. For example, it is extremely difficult to provide a clean and smooth surface due to debris formed by mechanical abrasions.

Tape burnish and tape wipe processes in which the tape moves orthogonal to the burnishing object without any rotational degree of freedom of the burnishing tape cannot generally effectively remove the particles on the surface of the disk. These particles cause failure and/or decreased performance of the magnetic disc drives. This problem can be especially critical in magnetic discs made by the servo pattern printing process. This is because the particles on the surface can damage the stamper, which sequentially affects the quality of the printed discs. This invention allows the tape burnishing and tape wiping processes to be improved to meet the demands of high storage density and low fly height criteria.

The cleaning apparatus for burnishing asperities or defects from the surfaces of an article, e.g., a rigid magnetic disk, could use an abrasive burnishing tape, a pad, a cloth, a scrubber or any burnishing object that contacts and cleans the surface of the object. If the object is a disk, then the disk preferably rotates on a spindle while the burnishing object contacts the surface of the disk. The burnishing object could be held stationary at one location on the surface of the disk or moved during the burnishing process.

A burnishing head in accordance with the present invention can incorporate multiple levels of protrusion pad size and shape control. This can be accomplished using either burnish pad design or heater design. Additionally, the pad can include multiple heater circuits and pad combinations so as to accommodate and handle complex head geometries as well as media topography.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage device, it will be appreciated by those skilled in the art that the teachings of the present invention can be applied to optical devices without departing from the scope and spirit of the present invention. The implementations described above and other implementations are within the scope of the following claims

We claim:
1. A burnishing head, comprising:
 a slider body;
 a burnishing pad supported by the slider body, the burnishing pad defining a cutting island; and
 a heating element selectively operable to protrude the cutting island from the slider body.

2. The burnishing head of claim 1 wherein the heating element thermally expands the burnishing pad.

3. The burnishing head of claim 1 wherein the heating element thermally protrudes the cutting island.

4. The burnishing head of claim 1 comprising a plurality of cutting islands.

5. The burnishing head of claim 4 wherein at least two or more of the plurality of cutting islands are aligned.

* * * * *